C. H. STEPHENSON.
REFUSE DISPOSAL DEVICE.
APPLICATION FILED NOV. 23, 1909.

1,011,874.

Patented Dec. 12, 1911.

3 SHEETS—SHEET 1.

Witnesses:

Inventor:
Charles H. Stephenson,
By Wright, Brown, Quinby & Frey
Attys.

C. H. STEPHENSON.
REFUSE DISPOSAL DEVICE.
APPLICATION FILED NOV. 23, 1909.
1,011,874.
Patented Dec. 12, 1911.
3 SHEETS—SHEET 2.
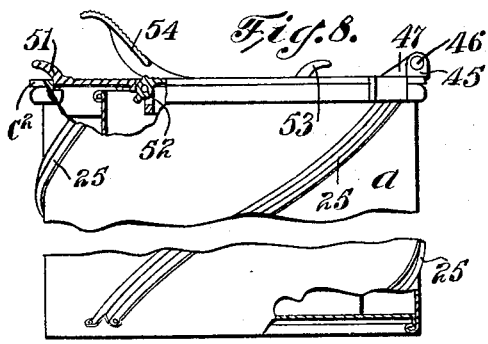
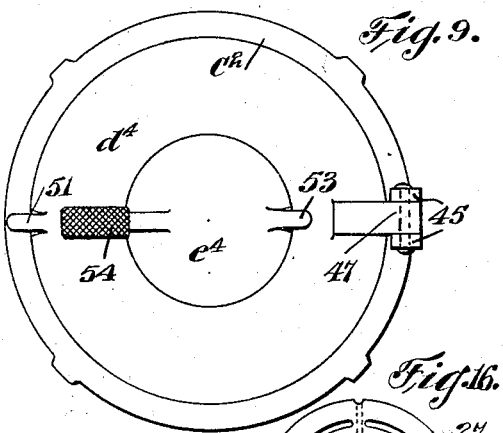
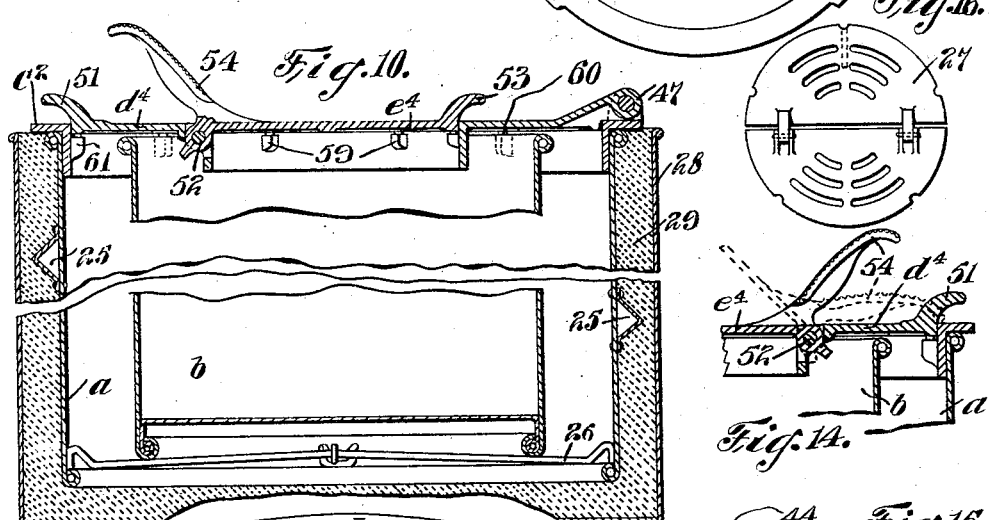
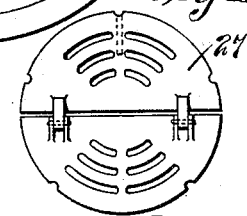
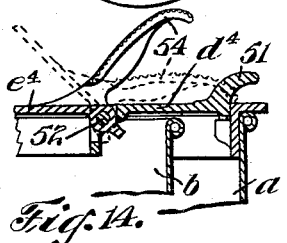
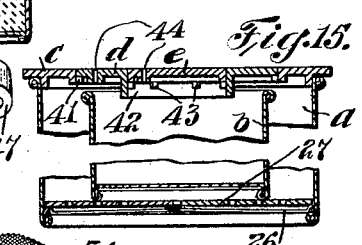
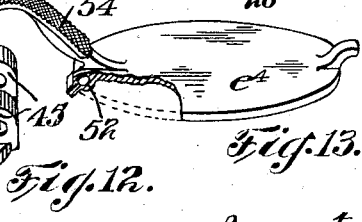
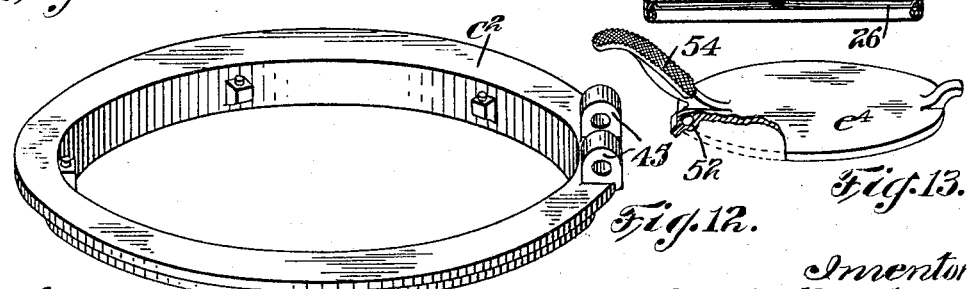
Inventor:
Charles H. Stephenson,
Witnesses:

C. H. STEPHENSON.
REFUSE DISPOSAL DEVICE.
APPLICATION FILED NOV. 23, 1909.
1,011,874. Patented Dec. 12, 1911.
3 SHEETS—SHEET 3.
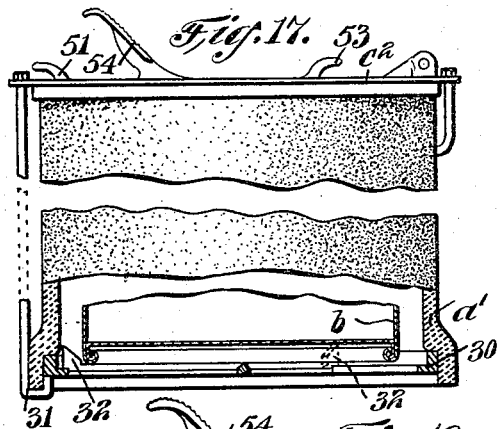
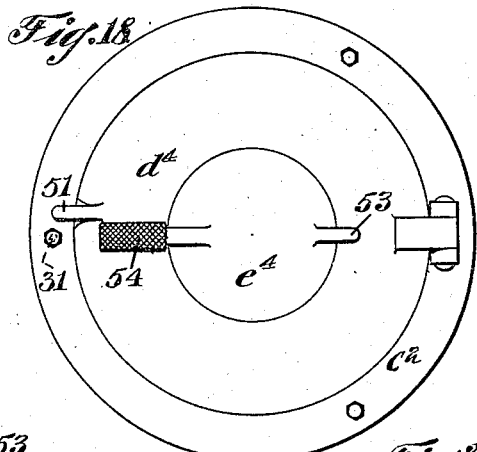
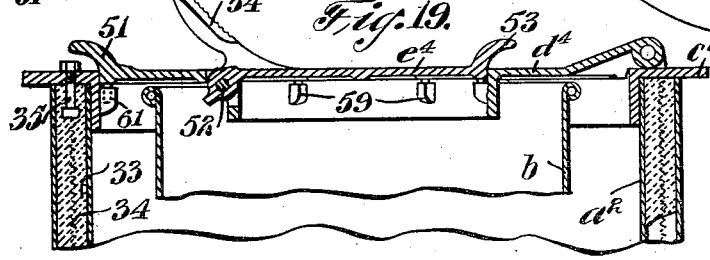
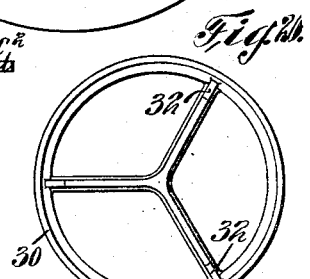
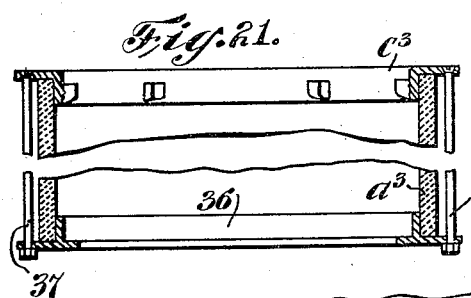
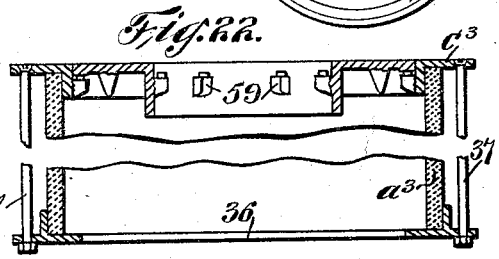
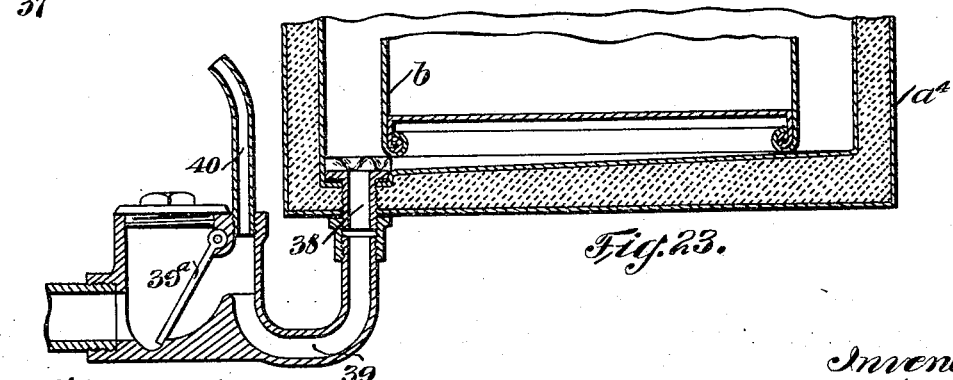
Inventor:
Charles H. Stephenson,

UNITED STATES PATENT OFFICE.

CHARLES H. STEPHENSON, OF LYNN, MASSACHUSETTS.

REFUSE-DISPOSAL DEVICE.

1,011,874.   Specification of Letters Patent.   Patented Dec. 12, 1911.

Application filed November 23, 1909. Serial No. 529,628.

*To all whom it may concern:*

Be it known that I, CHARLES H. STEPHENSON, of Lynn, in the county of Essex and State of Massachusetts, have invented certain new and useful Improvements in Refuse-Disposal Devices, of which the following is a specification.

This invention relates to receivers for different materials such as ashes or garbage or any waste material, and has particular reference to devices of this nature which are adapted to be set under ground, access being had for the deposit of the material by means of a cover section which is movable, and access being had for the removal of an inclosed can or container by means of a ring-shaped cover section.

The chief object of my invention is to provide a unit system of refuse disposal devices comprising a receiver, a can or container adapted to be removably placed therein, and a three-piece top some of the members of which are interchangeable with others.

Other objects of my invention are to improve the structure of devices of this nature to adapt them for different uses whether set under ground or entirely portable.

To these ends my invention consists primarily in refuse disposal devices comprising a series of units capable of different relative arrangements and of interchangeability and substitution one for another, to enable a complete apparatus to be assembled to meet the requirements of one of a plurality of conditions without necessitating a complete set for each one of those conditions.

My invention further consists in improvements in the construction of different members of the set to adapt them to meet the different conditions which are liable to be met with.

Figure 1:
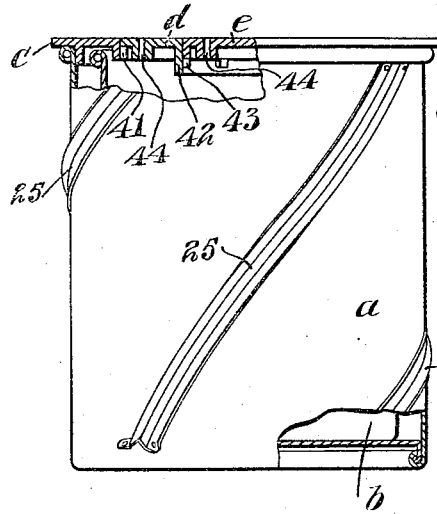
Figure 2:
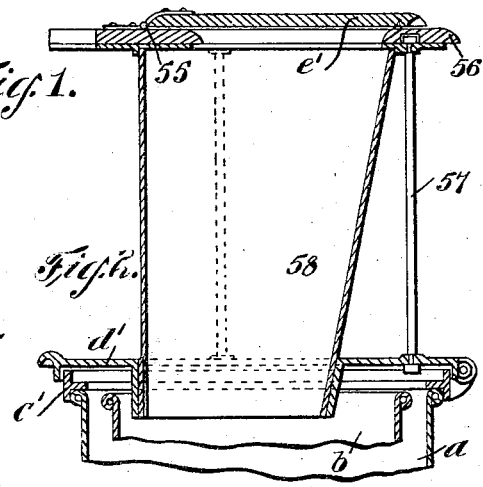
Figure 3:
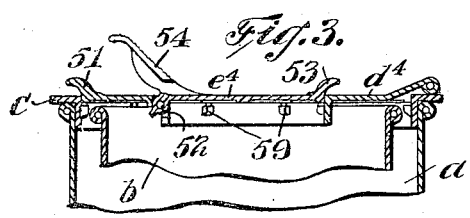
Figure 4:
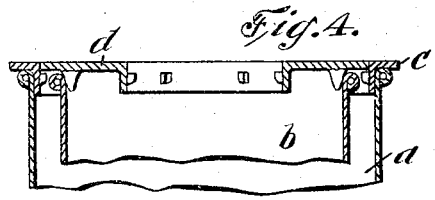

Of the accompanying drawings,—Figure 1, is an elevation, partly broken out illustrating a complete set of devices in one arrangement of assembling. Fig. 2 is a vertical sectional view including the upper portions of some of the members shown in Fig. 1 but with other members replaced by units of a different form. Figs. 3, 4, 5, 6 and 7 are views similar to Fig. 2 but representing other changes in the assemblage of units. Fig. 8 is a view similar to Fig. 1, the middle portion being broken out, and illustrating more completely the assemblage indicated in Fig. 3. Fig. 9 is a plan view of the structure shown in Fig. 8. Fig. 10 is a vertical sectional view on a larger scale of the parts shown in Fig. 8 but with the receiver inclosed in cement. Figs. 11, 12 and 13 are perspective views of the three top units shown in Figs. 3 and 10. Fig. 14 is a detail sectional view to illustrate the operation of opening the central section of the cover. Fig. 15 is a detail sectional view illustrating a modification in the structure of the bottom of the receiver. Fig. 16 is a plan view of a grid which may be used in connection with an open bottom receiver to prevent rats from gaining access to the receiver. Fig. 17 is a view similar to Fig. 8 but illustrating further modifications including a cement receiver. Fig. 18 is a plan view of the same. Fig. 19 is a detail sectional view of another modification hereinafter referred to. Fig. 20 is a plan view of the open metal bottom or spider used in connection with the form of receiver shown in Fig. 17. Figs. 21, 22 and 23 are detail sectional views illustrating other modifications hereinafter described.

Similar reference characters indicate the same or similar parts in all of the views.

A complete assemblage comprises five units which are indicated by the reference characters $a$, $b$, $c$, $d$, and $e$ with or without accompanying numerals. Each assemblage includes a receiver $a$ and a removable can or pail $b$, the receiver $a$ being adapted to be set in the ground if desired with its top flush with the surface, said receiver having a continuous bottom as indicated in Fig. 1, or open bottom as hereinafter described. The can or pail rests on such bottom and is adapted to be removed from the receiver when the contents thereof are to be disposed of. The top comprises an outer ring member $c$, a ring-shaped member $d$, which is movable to enable the inner can or pail $b$ to be removed, and a central section $e$ which is movable for the deposit of refuse in the can or pail $b$. These units $c$, $d$ and $e$, as will now be described, may be formed differently to meet different conditions, and the same may be true also of the receiver $a$, but the proportions of the parts are such that different structures of top can be used in connection with a receiver either of the form shown in Fig. 1 or the form shown in Figs. 10, 15, 17, 19, 21 and 23.

Figs. 1 to 7 inclusive are drawn to a uniform scale to make it more apparent how changes can be made in the assemblage of the cover members. In the other figures of the drawings, the scale differs considerably, for convenience of illustration but it is to be understood that the scale will be uniform so as to enable differently formed sections or members of the top to be interchanged one for another, and to enable any given assemblage of top units to be employed in connection with the different structures of receiver illustrated.

I will now proceed to describe the details of structure of the several parts shown.

The receiver $a$ may be provided with spiral strengthening ribs 25 which are more especially desirable when the receiver is above ground. Said ribs, however, will not interfere with the placing of the receiver underground, or placing it in cement as indicated in Fig. 10.

The bottom of the receiver may be entirely closed as shown in Figs. 1 and 8. But sometimes conditions are such that it is desirable that the bottom shall be open. For instance, if the receiver is to be placed in such a situation as might result sometimes in a flood of water filling the receiver, then it is desirable that the bottom shall be left open so that the water may drain out. If the bottom is left open, however, it is desirable that provisions shall be made to make the device rat-proof. When the bottom of the receiver is open, as shown in Fig. 15, a frame 26, made of wire or other suitable material is employed to support a grid 27, said grid having openings as shown in Figs. 15 and 16, to enable water to flow out. Such grid preferably consists of two members hinged together for convenience in placing it in the receiver. When the parts are assembled in the manner shown in Fig. 15, the can $b$ rests upon the grid 27. But if the open bottom receiver is inclosed in cement as shown in Fig. 10, there is then no need for the grid 27, and in this case the can $b$ rests upon the frame 26 to prevent the bottom of the can from chipping the cement. Such chipping would result in the can $b$ not being supported properly; that is, it would be liable to tilt as it would if no outer jacket or cement were employed. Consequently when the receiver $a$ is formed with an open bottom as in Figs. 10 and 15, the frame 26 is desirable, to support the can $b$ upright, by preventing it from resting directly on cement or earth.

As shown in Fig. 10, the receiver $a$ may be set inside of a slightly larger jacket 28, and the space between filled with cement 29, said cement protecting the receiver $a$ from oxidization. The jacket 28 would be employed merely to form the outer wall of the space in which the cement is to be placed. After this structure is placed in the ground and the cement is hardened, it makes no difference if the jacket 28 completely rusts away, the cement jacket then completely protecting the structure.

In Fig. 17, I have indicated the receiver as consisting of a length of terra cotta pipe $a'$. In the lower end of this pipe section $a'$ is a spider 30 which is secured in place by means of tie-rods 31 bearing against the bottom of the spider and extending up outside of the receiver $a'$ and through the flange of the ring top $c^2$ and secured by nuts. This spider 30 is shown as provided with lugs 32 having inwardly inclined upper edges to guide the can $b$ to a central position when it is inserted and prevent it from bearing against the wall of the receiver.

As shown in Fig. 19, the receiver may have inner and outer walls $a^2$ with an interposed filling of cement 33, which cement may have a metal reinforce 34. The ring top section $c^2$ in this structure, may be secured to the receiver unit by means of bolts 35 having their heads embedded in the cement and extending up through the flange of the ring top and secured by nuts.

As shown in Figs. 21 and 22, the receiver may consist of a straight section of pipe $a^3$ of earthenware or other suitable material, a bottom ring 36 fitting the lower end of the pipe and connected with the ring top $c^3$ by tie-rods 37 connecting flanges of the two rings. The vertical wall or flange of the bottom ring 36 may extend inside of the receiver portion $a^3$ as shown in Fig. 21, or outside of it as shown in Fig. 22.

As shown in Fig. 23, the receiver $a^4$ may be constructed substantially as in Fig. 10, but with an outlet pipe 38 leading from the bottom and having a suitable check-valved escape to a sewer or elsewhere, a trap being formed as at 39, which trap may have a vent 40. In said Fig. 23 the bottom of the receiver $a^4$ is shown as having grooves with inclined bottoms converging at the outlet 38. This structure of receiver is especially designed for placing underground in locations where there is sufficient elevation to permit of the automatic drainage of water that might find its way into the receiver from any cause such as very heavy rains. This structure shown in Fig. 23 is also especially for use in locations where the ground in which the device is to be set may only be a few inches above the highest tides. In such case, the check-valve $39^a$ would prevent a back flow due to a high tide, from finding its way into the receiver, but the low tide would permit any water that gets into the receiver from any cause, to flow out.

As has been stated the top comprises three sections. The outer one which I refer to as the ring top, is removably supported by the receiver. When the entire top is to be flush with the surface of the ground, such as when used in a sidewalk and when it is desired to utilize the device for the reception of street or pavement sweepings, these three sections of the top will preferably comprise members such as shown in Fig. 1, the ring top $c$ having a flange fitting inside of the top of the receiver and having an opening provided with a circular series of lugs 41 on which the outwardly projected flange of the ring-shaped cover $d$ rests. Said ring-shaped cover $d$ is formed with an opening formed by a flange which in use constitutes a chute 42. The inner wall of this chute is provided with lugs 43 which support the margin of the central cover section $e$. The tops of the three members $c$, $d$ and $e$ are flush, and the members $d$ and $e$ have holes 44 in which a suitable lifting tool can be inserted. The central section $e$ is to be lifted out when dust or sweepings are to be swept into the device, such dust being guided into the can $b$ by means of the chute 42. If desired, a larger opening may be afforded by removing the section $d$ by means of a tool inserted in its hole 44, or if the pail or can $b$ is of a less size than shown in Fig. 1, such pail or can may be removed and the contents dumped into the street-cleaning wagon whenever the ring-shaped cover $d$ is removed.

Figure 5:
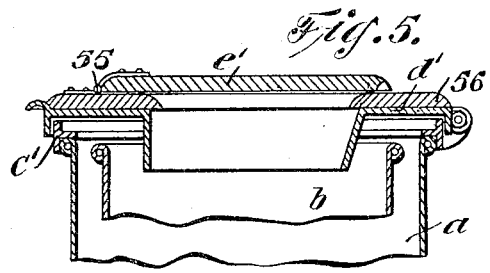
Figure 6:
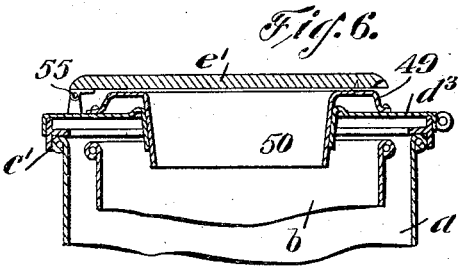

As shown in Figs. 2, 5 and 6 the outer or ring top may have an inwardly projecting flange to rest on the top of the receiver $a$, the outer edge of this supporting flange being surrounded by a band forming a flange projecting both above and below the plane of the horizontal flange. This structure provides a ring top which is supported on the receiver and prevented from laterally moving thereon, said ring top presenting a support with an upwardly extending cushion which will snugly receive any temporary or other cover that might be placed therein if a very cheap set of units were desired. This form of ring top is indicated at $c'$. As shown in Figs. 8, 9, 10 and 12 the ring top $c^2$ may have lugs 45 to support a pintle 46 projecting through the lug 47 of the ring shaped cover $d^4$, this structure enabling the ring and central members of the cover to be turned up on the hinge afforded by said lugs and pintle. The ring-shaped cover may be of the form shown at $d'$ in Figs. 2 and 5 and hingedly supported, or as at $d^2$ in Fig. 7 in which case it is entirely removable. And it may have tapered lugs 48 to hold the units $a$ and $b$ properly spaced. As shown at $d^3$ in Fig. 6 the ring-shaped cover may be formed of sheet metal and may have a superimposed piece comprising a sheet metal seat member 49 formed with an integral chute member 50. In most of the other figures of the drawing, the ring-shaped cover is indicated $d^4$, in each case being hinged and having a chute around a central opening and having a handle 51 by which it may be lifted. For most purposes, where garbage is the refuse to be disposed of, this form is preferred. In connection with this type of ring-shaped cover section, I preferably employ a central cover section indicated at $e^4$ in Figs. 3, 8, 9, 10, 13, 14, 17, 18, and 19. Said central cover section $e^4$ is hinged to the section $d^4$ as at 52, and has a handle 53 by which it may be swung upward, and having also a foot piece 54 so that the section $e^4$ can be lifted by pressing the foot on the piece 54. The foot piece 54 is rigid with the cover section, preferably by being made integral therewith, as clearly indicated in the figures of the drawing referred to. The normal position for said foot piece, when the cover is closed, is such that it projects upwardly and outwardly in a generally inclined direction beyond the pivotal connection 52 of the cover. And the upper face of the foot piece is shown as convex and roughened. This structure enables the cover to be raised sufficiently to enable a bucket to be emptied into a receiver, by simply placing the toe portion of one foot on the convex upper face of the foot piece, and pressing downwardly. The heel may rest on the ground or another portion of the structure of the device. This leaves both hands free so that one hand can support the bucket while the other hand tilts it. And it is never necessary to stoop low enough to grasp any part of the cover while deposits are being made. Owing to the convex face of the pressure receiving portion of the foot-piece, the first pressure downward has the greatest lifting force because the pressure is exerted on the outer end of the foot piece. As the cover rises the point of contact of the shoe sole gradually shifts along nearer to the pivotal point. Consequently the greatest leverage is obtained when overcoming inertia of the cover, the leverage growing less as the cover swings upwardly, finally resulting in requiring the least amount of pressure to keep the cover raised during the dumping of the contents of a bucket into the receiver. This feature of the invention is especially desirable in very cold weather when a person is liable to issue from a kitchen with wet or moist hands so that there may be liability of injury to the fingers by the freezing to the cover or a handle if it had to be grasped by hand. And the device is simple and has no joints.

Figure 7:
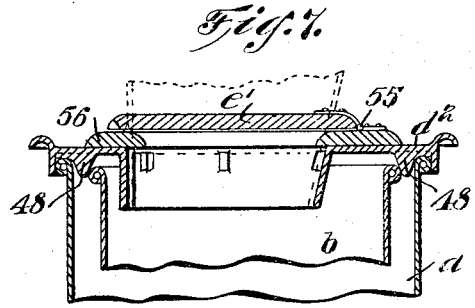

As shown in Figs. 2, 5, and 7, the receiving cover may be a lid $e'$ hinged at 55 to a seat 56 which seat may in turn be supported on the member $d'$ as shown in Fig. 5, or may be supported considerably above the member $d'$ as shown in Fig. 2. In the latter case, supporting rods 57 are employed, and a chute 58 connects the seat 56 with the chute portion of the ring cover $d'$. It will therefore be understood that units may be assembled, for instance, as shown in Fig. 2 or as shown in Fig. 5. When assembled, as shown in Fig. 5, the device may be useful without being embedded in the earth. When the receiver $a$ is to be embedded in the earth, then the more expensive structure indicated in Fig. 2 will probably be preferred. But this structure shown in Fig. 2 enables the device to be used for a different purpose. That is, when the members 58, 56 and $e'$ are no longer to be used during, perhaps, the erection of a new building, said members can be removed and top sections more suitable for a garbage receiver can be substituted therefor without having to remove the receiver $a$ from its depressed position in the ground. In Fig. 7, the dotted lines indicate how the form of ring cover $d^2$ may be substituted for the form $d'$ in Fig. 1, and still enable an elevated seat 56 to be employed. In said Fig. 7, the member $d^2$ is formed with a downwardly extending flange which, when the seat 56 and lid $e'$ are removed, may receive a chute such as shown at 58 in Fig. 2, the seat 56 and lid $e'$ being then mounted upon the flange at the upper end of the chute 58, this being a knock-down structure which might sometimes be preferred for temporary uses as it would be cheaper than the more permanent structure shown in Fig. 2.

In most of the forms shown, the opening in the ring-shaped section of the cover is provided with inwardly projecting lugs 59 supporting rubber cushions 60, so that whether the central cover section is a heavy one or not or a hinged one or one which is entirely removable, it will not be noisy if allowed to drop to closed position. Similar lugs and cushions are preferably employed in some of the forms of ring tops, as shown, for instance, at 61 in Fig. 19.

It is to be observed that in those forms of receiver shown in Figs. 10, 19 and 23, there is a lining of metal intervening between the inner walls of the cement and the receiver, thus reducing tendency of the cement to become contaminated.

It will now be understood that with the several units having corresponding diameters so that one can be substituted for another in even a greater variety than illustrated, it is possible for the manufacturer or dealer to supply the wants of a great many different customers who have different conditions to meet as to locations and uses, and whose conditions, financial or otherwise, may require the dealer to assemble the units to make a more or less expensive whole. The manufacturer or dealer can do this without having to keep in stock a complete equipment for each of the conditions that may have to be met.

Of course it is essential, for the present purposes, that the cover having the rigid foot-piece shall be held in a definite open position during continuous downward pressure of the foot, so that said cover will neither be drawn so high as to strike the ankle of the user, nor fail to close automatically when the pressure is released. In the device as illustrated, this result is obtained by the shape of the foot piece, the under side of which contacts with the upper surface of the member to which the cover is hinged to definitely insure that the limit of the open movement of the cover shall be substantially such as indicated by the dotted lines in Fig. 14. I do not limit myself, of course, to such angle of opening, it being essential, however that the opening movement of the cover shall be less than 90°.

The inter-changeable unit feature provides that two or more units of different character may be substituted, one for another; that is, one unit may be taken away, and its place occupied by another unit which fits the same place, but such substitution adapting the whole assemblage to be applied to a different use from that for which the first or removed unit adapted it. Such change imparts a new function to the assemblage, or, in other words, by changing one part or unit, a very different complete article may be assembled, without necessity of the dealer carrying any such large stock of units as would be required to provide for so many different assemblages, if the units were not inter-changeable as described.

It is to be understood that I do not limit myself to the exact design, details of structure, and proportions of parts shown in Figs. 1 to 7, for instance, but I may vary the same considerably without departing from the spirit of my invention which in its broad aspect consists in providing a series of units capable of different relative arrangements and of interchangeability and substitution one for another, to enable a complete apparatus to be assembled to meet the requirements of any one of a large number of different conditions, without necessitating a complete set suitable for each one of those conditions.

I claim:

1. A unit system of refuse disposal devices, comprising a set of inter-changeably fitting members, said set including a receiver for a removable receptacle, a plurality of ring-shaped cover sections differing from each other but each adapted to removably fit the top of the receiver, and central cover sections to close the openings in the several ring-shaped cover sections.

2. A unit system of refuse disposal devices, comprising a set of inter-changeably fitting members, said set including a receiver for a removable receptacle, and a series of three-piece covers for said receiver, the pieces of one series differing from those of another series, but inter-changeable to increase the variety of assemblages that may be made up from the entire set.

3. The combination with a receiver for refuse material, of a pivotally mounted cover therefor, said cover having a rigid foot-piece permanently projecting outwardly beyond the pivotal point whereby the cover may be raised by downward pressure on said foot-piece, said foot-piece being provided with means to interrupt the opening movement of the cover at a point to hold the said cover inclined forwardly over the receiver, whereby release of said pressure will permit the cover to close by gravity.

4. The combination with a receiver for refuse material, of a pivotally mounted cover therefor, said cover having a rigid foot-piece permanently projecting in an upwardly and outwardly inclined direction beyond the pivotal connection, said foot piece being provided with means to interrupt the opening movement of the cover, whereby the latter may be held firmly in a definite open position by continued pressure on the foot-piece.

5. The combination with a receiver for refuse material, of a pivotally mounted cover therefor, said cover having a rigid foot-piece permanently projecting in an upwardly and outwardly inclined direction beyond the pivotal connection, the outer end of the foot-piece having a convex upper face to receive the pressure of the foot, the under face of said foot piece being provided with a longitudinally arranged stop, whereby the cover may be held firmly in a definite open position by continued pressure on the foot-piece.

6. The combination with a receiver adapted to hold a removable receptacle, of a hinged ring-shaped cover and a hinged central cover section, the hinges of the two being substantially diametrically opposite each other, the central cover section having a rigid foot piece permanently projecting in an upwardly and outwardly inclined direction beyond the pivotal connection.

In testimony whereof I have affixed my signature, in presence of two witnesses.

CHARLES H. STEPHENSON.

Witnesses:
  A. W. HARRISON,
  P. W. PEZZETTI.